United States Patent [19]

Ludwig

[11] Patent Number: 5,450,558
[45] Date of Patent: Sep. 12, 1995

[54] SYSTEM FOR TRANSLATING VIRTUAL ADDRESS TO REAL ADDRESS BY DUPLICATING MASK INFORMATION IN REAL PAGE NUMBER CORRESPONDS TO BLOCK ENTRY OF VIRTUAL PAGE NUMBER

[75] Inventor: Mark A. Ludwig, Loveland, Colo.

[73] Assignee: Hewlett-Packard Company, Palo Alto, Calif.

[21] Appl. No.: 888,672

[22] Filed: May 27, 1992

[51] Int. Cl.$^6$ .............................. G06F 12/10
[52] U.S. Cl. .................. 395/418; 364/254.3; 364/256.3; 364/957.1; 364/DIG. 1; 395/413
[58] Field of Search ............... 395/400, 425; 365/254.3, 256.3, 957.1, 961.2

[56] References Cited

U.S. PATENT DOCUMENTS

| | | | |
|---|---|---|---|
| 3,764,996 | 10/1973 | Ross | 395/400 |
| 4,680,700 | 7/1987 | Hester et al. | 364/200 |
| 4,835,734 | 5/1989 | Kodaira et al. | 364/900 |
| 5,123,101 | 6/1992 | Sindhu | 395/400 |
| 5,133,058 | 7/1992 | Jensen | 395/400 |
| 5,193,160 | 3/1993 | Tsubota | 395/400 |
| 5,222,222 | 6/1993 | Mehring et al. | 395/400 |
| 5,226,133 | 7/1993 | Taylor et al. | 395/400 |
| 5,233,700 | 8/1993 | Takagi | 395/400 |
| 5,265,227 | 11/1993 | Kohn et al. | 395/400 |
| 5,287,482 | 2/1994 | Arimilli et al. | 395/425 |
| 5,295,258 | 3/1994 | Jewett et al. | 395/575 |
| 5,347,636 | 9/1994 | Ooi et al. | 395/400 |

OTHER PUBLICATIONS

E. DeLano, W. Walker, J. Yetter and M. Forsyth, "A High Speed Superscalar PA-RISC Processor", presented at the proceedings of the Compcon Spring 1992, Digest of Papers, Feb. 24, 1992.

Primary Examiner—Thomas C. Lee
Assistant Examiner—Moustafa M. Meky

[57] ABSTRACT

Disclosed is an apparatus and method which combines the mask information with the virtual page number in each block entry of a translation lookaside buffer of a virtual memory system. The invention defines a range of pages that are translated by a block entry, thus providing space in the virtual page number for the mask bits. The mask information is duplicated in the real page number of the block entry that corresponds to the virtual page number. This duplication allows the mask information to be easily sent to the bus driver circuits where it is needed to select the bits that form the real page number.

8 Claims, 7 Drawing Sheets

SYSTEM FOR TRANSLATING VIRTUAL ADDRESS TO REAL ADDRESS BY DUPLICATING MASK INFORMATION IN REAL PAGE NUMBER CORRESPONDS TO BLOCK ENTRY OF VIRTUAL PAGE NUMBER

CROSS REFERENCE TO RELATED APPLICATIONS

This application is related to application Ser. No. 07/726,619 filed Jul. 8, 1991 of Jeffry E. Trull (now abandoned), entitled "Cache memory replacement selector", and application Ser. No. 07/888,673 filed May 27, 1992 of Mark A. Ludwig (still pending), entitled "Fast Lookahead Circuit to Identify an Item in a Large Binary Set", both owned by the same entity.

FIELD OF THE INVENTION

This invention relates to computer systems and more particularly to virtual memory within such computer systems. Even more particularly, the invention relates to a method and apparatus for masking bits in a block entry of a translation lookaside buffer of a virtual memory system.

BACKGROUND OF THE INVENTION

Computers often use virtual memory and cache memory to improve performance. A virtual memory system allows frequently used data and program code to reside in RAM, while less frequently used data and program code is kept on slower storage, such as a disk drive. When a unit of data or program code is requested, the system determines whether the unit of data is contained in the RAM, or within the slower speed device. If the data is contained within the RAM, the processor retrieves it directly from the RAM and thereby avoids retrieving it from the slower device.

Data is retrieved through a key. A translation lookaside buffer, contained within the processor, is searched for an entry that matches the key. If such an entry is found, the translation lookaside buffer returns the actual location of the data in the RAM. The processor then retrieves the entry directly from the RAM using this location.

In a virtual memory system, the data is retrieved in units called pages. Therefore, the key is a virtual page number (VPN), and the data is contained in a RAM memory page having a real page number (RPN). The translation lookaside buffer contains entries having a VPN and a corresponding RPN. When the translation lookaside buffer is searched, using a VPN, and a match is found, the buffer returns the corresponding RPN from the matching entry. The RPN is then used to access the data within RAM. If a matching entry is not found in the translation lookaside buffer, the data is retrieved from the disk, placed in RAM at some real page location, and an entry containing the RPN of the real page location, along with the corresponding VPN, is then placed into one of the entries of the translation lookaside buffer.

Because the translation lookaside buffer contains a relatively small number of entries, it fills up quickly. Sometimes large sections of data or program code are closely related, and therefore will probably be used together. For example, parts of an operating system often must remain in memory at all times. To maximize performance, these sections are stored together in RAM, and a special type of translation lookaside buffer entry is used to reference them. This type of entry is called a block entry, and it is capable of translating a virtual page number to a real page number for more than one page, typically a large number of pages. This is possible because the section of data or program code is stored contiguously in RAM, therefore it has sequential virtual and real page numbers.

These sections of data or program code are variable in size, however, so the block entries must allow translation of different sized areas. In order to accommodate these different sizes, a block entry must have a method of fixing the size of the area to be translated. In prior art systems, this has been accomplished with a mask register, which is typically used to define the size for more than one block entry. This causes two problems. The first problem is the size of the circuitry of the mask register. Since the translation lookaside buffer is built into a processor integrated circuit, this circuitry occupies valuable space on the integrated circuit. Also, additional space is needed for wiring traces to connect the mask registers with the block entries. The second problem is the number of mask registers has been limited, by having a mask register define the size for more than one block entry, thus restricting the number of sections of data or program code that could be translated using block entries.

Therefore, there is need in the art for an improved apparatus and method for defining the mask bits for a block entry of a translation lookaside buffer. There is a further need for such an apparatus and method that provides a mask register for each block entry in the translation lookaside buffer. The present invention meets these and other needs.

This application is related to application Ser. No. 07/726,619 filed Jul. 8, 1991 of Jeffry E. Trull (now abandoned), entitled "Cache memory replacement selector", and application Ser. No. 07/888,673 filed May 27, 1992 of Mark A. Ludwig (still pending), entitled "Fast Lookahead Circuit to Identify an Item in a Large Binary Set", both owned by the same entity, both of which are incorporated herein by reference for all that is disclosed and taught therein.

SUMMARY OF THE INVENTION

It is an aspect of the present invention to provide an apparatus and method for defining the size of a memory area that can be translated by a block entry of a translation lookaside buffer within a virtual memory system.

It is another aspect of the invention to provide such an apparatus and method that eliminates the need for a separate mask register.

Still another aspect of the invention is to duplicate the mask information to avoid copying the information from one location in the translation lookaside buffer to another.

The above and other aspects of the invention are accomplished in a circuit which combines the mask information with the virtual page number in each block entry of the translation lookaside buffer. By defining a range of pages that can be translated by a block entry, the invention provides space in the virtual page number for the mask bits. This eliminates the need for a separate mask register, eliminates the need for connecting traces from the separate mask registers, and allows each block entry to have separate mask bits that define the size of the space that can be translated by the block entry.

The mask information is duplicated in the real page number of the block entry that corresponds to the virtual page number. This duplication takes no additional space while allowing the mask information to be easily sent to the bus driver circuits where it is needed to select the bits that form the real page number. In addition, this duplication eliminates the connecting traces between the mask register and the bus driver circuits.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
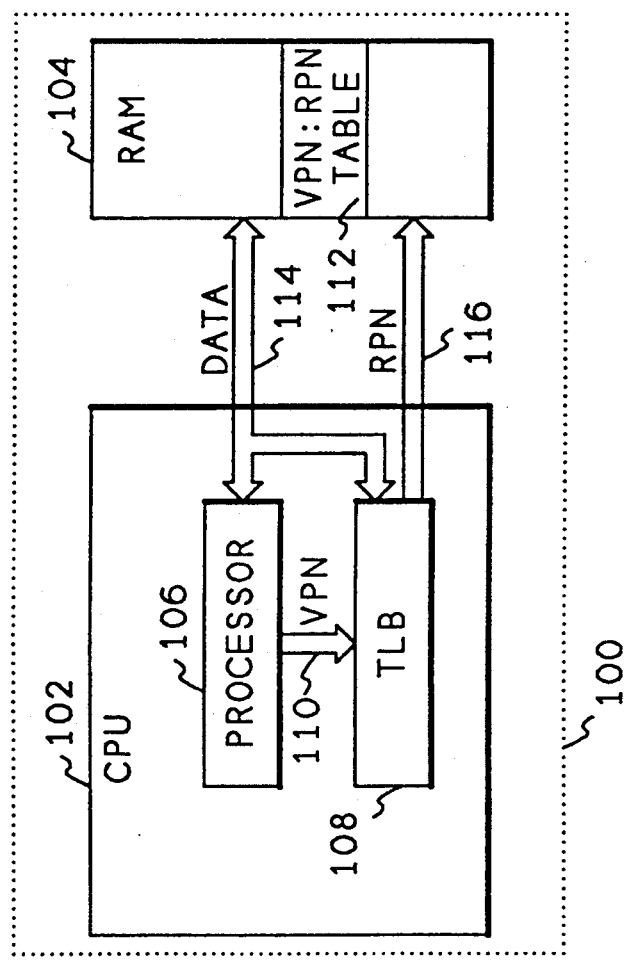
FIG. 1 shows a central processing unit of a computer having a translation lookaside buffer.

FIG. 1 shows a block diagram of a computer system having a translation lookaside buffer of the present invention used in a virtual memory system. Referring now to FIG. 1, a computer system 100 contains a central processing unit 102, which accesses a random access memory (RAM) 104 through a data bus 114. A processor 106, contained within the CPU 102, performs arithmetic and logic instructions within the computer system 100.

Memory within the RAM 104 is divided into blocks called pages. A page is a group of contiguous memory, typically having a binary multiple in size. For example, a page is typically 1024 bytes, 2048 bytes, 4096 bytes, etc. in size. Often, the page size can be selected by software running in the computer system 100.

When the processor 106 desires to access data within the RAM 104, it passes a page address part of the data address to a translation lookaside buffer (TLB) 108 over a VPN bus 110. This address is called the virtual page number (VPN) and it must be translated to a real page number (RPN) which is the address of the page within the RAM 104 where the data is located. In order to perform the translation between a VPN and a RPN, the TLB 108 uses a VPN:RPN table 112 contained within the RAM 104. The VPN:RPN table contains a translation between all possible virtual page numbers and the corresponding real page numbers that contain the data for the virtual page. However, if the real page is not contained within the RAM, that is, it is contained on slower storage device such as a disk, the RPN will indicate the location on the disk rather than the location in the RAM 104. If the access is to a page which is not contained in RAM, the TLB 108 will cause an interrupt which notifies a software routine, typically called a virtual page manager, which retrieves the page from disk and places it in RAM. The system then repeats the instruction in order to access the data in the RAM.

To perform the translation from a virtual page number to a real page number, the TLB accesses the VPN:RPN table 112. After an access to the table 112, the entry containing the virtual page number and corresponding real page number is placed into an entry within the TLB 108. Therefore, the next time data on this page is accessed, the TLB can make the translation immediately without having to retrieve part of the table 112 from the RAM 104. In this manner, translation speed is greatly increased.

Often, a section of data or program code larger than a page will be used together. These sections can be several pages or even several hundred pages in size. Translation lookaside buffers sometimes contain block entries to access these large sections of data or program code. A block entry allows the translation of any one of a contiguous range of virtual page numbers into one of a contiguous range of real page numbers. Thus, for example, using a single block entry, virtual addresses for a one megabyte contiguous section of program code could be translated to a one megabyte contiguous area of real memory.

The size of these sections of data or program code often varies. Therefore, the range of addresses that can be translated by a single block entry also needs to vary. This range variance has been performed in prior art systems using a mask register, which defined the range for a number of block entries. In the present invention, the mask bits have been placed within the virtual page number of the block entry, as well as in the real page number of the block entry, thus eliminating the need for a separate mask register.

Figure 2:
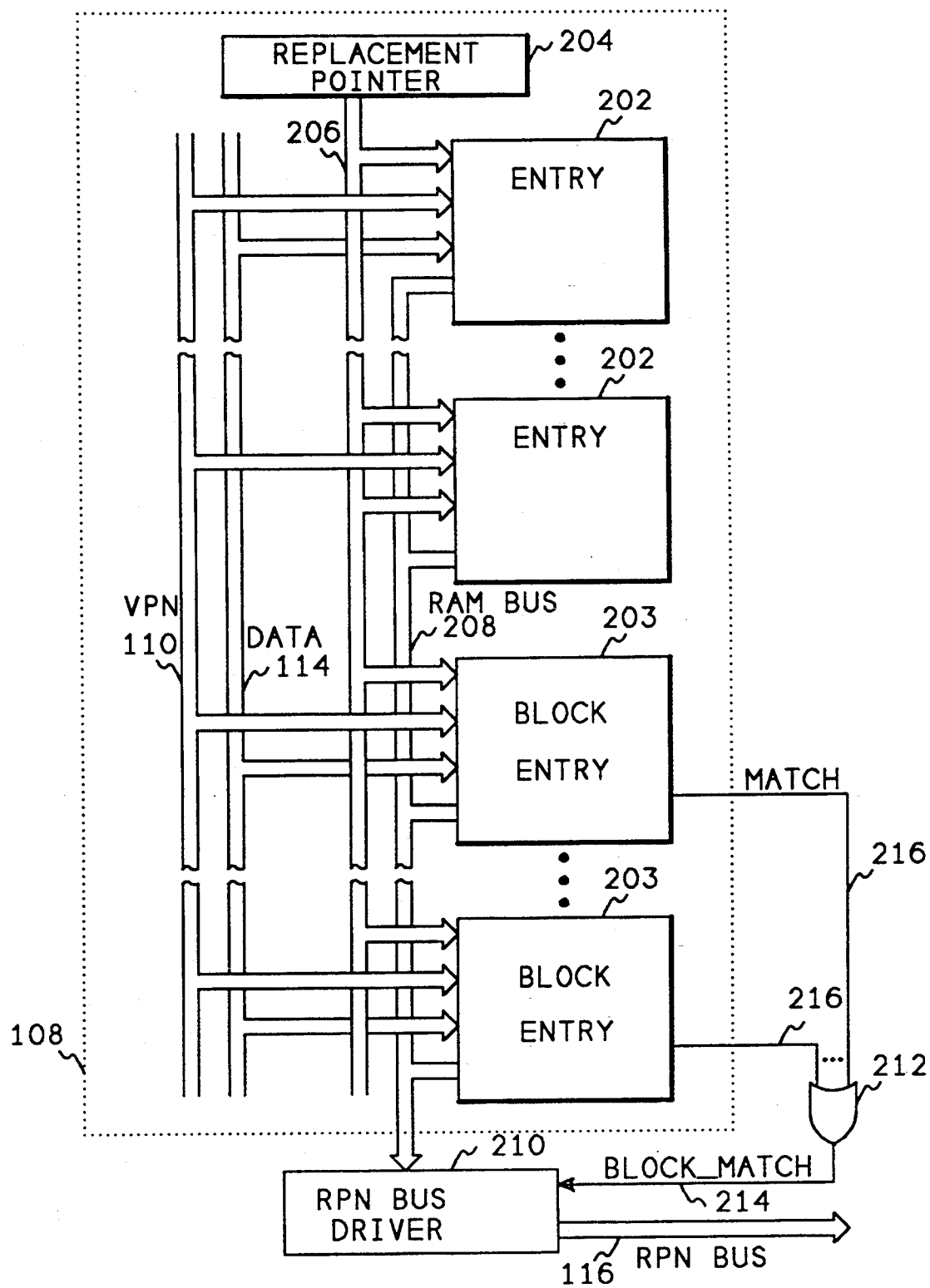
FIG. 2 shows a block diagram of the translation lookaside buffer.

FIG. 2 shows a block diagram of the translation lookaside buffer 108, incorporating the block entries of the present invention. Referring now to FIG. 2, the translation lookaside buffer 108 contains a plurality of entries 202, each capable of translating a single page number. For example, a typical TLB might contain 64–128 entries 202. As discussed above, when the processor 106 (FIG. 1) sends a virtual page number over the VPN bus 110, each of the entries 202 examines their contents for a match between the VPN contained in the entry 202 and the VPN from the VPN bus 110. If a match occurs in an entry, the entry sends a real page number over the RAM BUS 208, through an RPN BUS DRIVER 210 and out over the RPN bus 116. This RPN is then used to access the RAM 104 (FIG. 1).

The translation lookaside buffer 108 also contains a plurality of block entries 203, each capable of translating a range of page numbers. For example, a typical processor may contain 4–16 block entries. Each of the block entries 203 also examines the VPN bus 110 for a match with the virtual page number contained in the block entry, however, the block entries exclude a number of low order bits from taking part in the matching. The number of low order bits excluded depends upon the range of pages being translated by the block entry. Thus, for example, seven bits will be excluded if the range is 128 pages, and 14 bits would be excluded if the range is 16K pages.

In the present invention, the number of pages in the range is variable. The only requirement is that the number bits excluded by not addressing the minimum number of pages must be at least the number of additional bits necessary to address the number of additional pages between the minimum and the maximum number of pages. For example, if the minimum number of pages in the range is 128, which allows the seven low order address bits to be excluded from the comparison, the maximum number can be 16384, which requires seven additional bits in the address. Other examples are a minimum of 64 pages and a maximum of 4096 pages; minimum of 64 pages, maximum of 2048 pages; and minimum of 256 pages, maximum of 64536 or less pages.

Each of the block entries 203 outputs a MATCH signal 216 when a match occurs between the virtual page number stored in the entry and the virtual page number on the VPN bus 110. The process of matching these two values will be described below with respect to FIGS. 3 and 4. These MATCH signals 216 are ORed together in OR circuit 212 to form a BLOCK_MATCH signal 214, which is input to the RPN BUS DRIVER circuit 210. The RPN BUS DRIVER connects the output of the RAM BUS 208 to the RPN BUS 116, using mask bits, as will be described below with respect to FIGS. 3-7. By limiting the circuit to a single block entry 203, RPN BUS DRIVER circuits for the block entry could be combined with the block entry 203.

The replacement pointer register 204 and the data bus 114 are used to load a virtual page number into an entry or a block entry.

Figure 3:
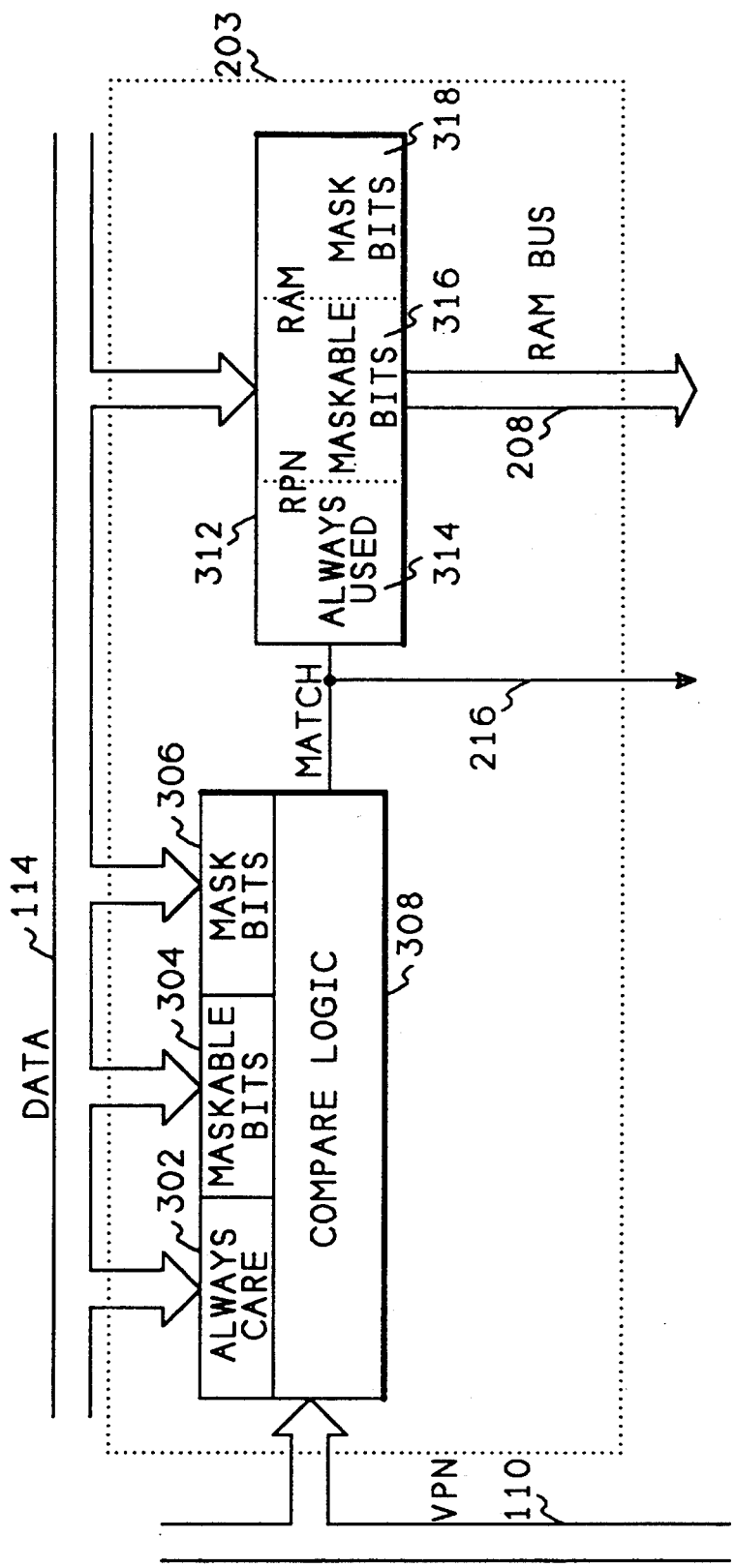
FIG. 3 shows a block diagram of the block entry of FIG. 2.

FIG. 3 shows a block diagram of a block entry 203 of FIG. 2. Referring now to FIG. 3, the block entry 203 contains a virtual page number register comprising an always care section 302, a maskable bits section 304, and a mask bits section 306. The mask bits section 306 stores the mask bits that determine which of the maskable bits stored in the maskable bits section 304 will be used and which will be excluded from a compare. There is a one to one correspondence between the mask bits and the maskable bits such that the low order mask bit corresponds to the low order maskable bit, the next lowest order mask bit corresponds to the next lowest order maskable bit, etc. A one bit in a mask bit will cause the corresponding maskable bit to be used in the comparison, and a zero will prevent the corresponding maskable bit from being used in the comparison. Because of this correspondence, the maskable bits section 304 can be no larger than the mask bits section 306, however, it may be smaller.

In the preferred embodiment of the present invention, the always care section 302 is 22 bits wide, and the maskable bits section 304 and the mask bits section 306 are each seven bits wide. Also in the preferred embodiment, the minimum number of pages that are translated by a block entry is 128 pages, and the maximum is 16384 pages. Since the minimum number of pages translated is 128, the low order seven bits of the virtual page number is not needed, so these bits of the virtual page number can be used to store the mask bits. Since the range of pages that can be translated is 128 to 16384, the next seven bits in the virtual page number are the maskable bits which select the size of the block. For Example, if the mask bits contain a binary value of 1111000, the high order four bits of the maskable bits will be used in the comparison, thus the block entry will translate 1024 pages.

The compare logic 308 compares the virtual page number from the VPN bus 110 with the virtual page number in the virtual page number register of the block entry. The always care bits 302 will always be compared to corresponding bits of the VPN, and the maskable bits section 304 that have corresponding mask bits set to one will be compared to bits in the VPN. The maskable bits that have corresponding mask bits set to zero will be considered "don't care" bits and will not affect the compare results. If a match occurs between the VPN and the block entry, the MATCH signal 216 is sent to the RPNRAM 312, and to the OR circuit 212 (FIG. 2). This signal will cause the RPNRAM to transfer its contents over the RAM BUS 208 to the RPN BUS DRIVER circuit 210 (FIG. 2). The RPN RAM may be a register within the block entry.

The RPN RAM 312 contains a real page number stored in the always used section 314 and maskable bits section 316. The mask bits stored in mask bits section 318 are identical to the mask bits stored in section 306. The mask bits from section 318 are transferred over the RAM BUS 208 to the RPN BUS DRIVER 210 along with the always used bits 314 and the maskable bits 316 when a MATCH signal 216 is received by the RPN RAM. THE RPN BUS DRIVER 210 (FIG. 2) selects bits being translated from the RAMBUS 208 and selects the bits not being translated from the VPN bus 324 to form the real page number which is sent over the RPN bus 116 to the RAM (FIG. 1).

Figure 4:
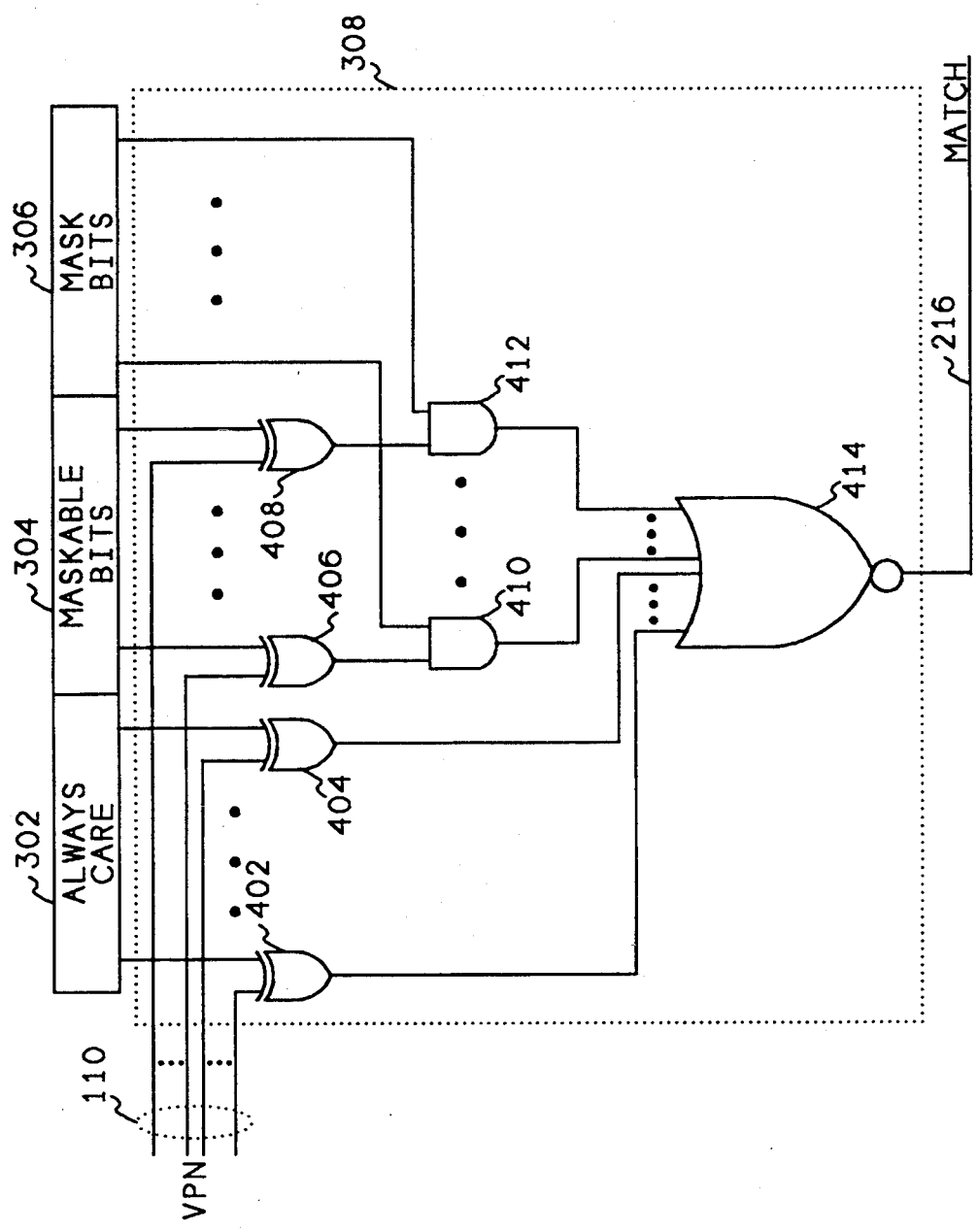
FIG. 4 shows a logic diagram of the compare logic of FIG. 3.

FIG. 4 shows a logic circuit of the compare logic 308. Referring now to FIG. 4, signals from the VPN bus 110 are compared to the always care bits 302 and the maskable bits 304 using XOR circuits such as XOR circuits 402, 404, 406, and 408. One of the XOR circuits is used for each bit of the always care bits 302 and the maskable bits 304. The results of comparing the maskable bits 304 to the bits of the VPN bus 110 are then ANDed with the corresponding mask bits by AND circuits such as the AND circuits 410 and 412. If a mask bit is a logical one, the comparison result of the corresponding maskable bit and the VPN bus bit will be gated to the NOR circuit 414. If the mask bit is a logical zero, a logical zero will be gated to the NOR circuit 414, thus making the corresponding maskable bit a "don't care". The NOR circuit combines the comparison results and sets the MATCH signal 216 to a one if the bits all matched the VPN bus bits 110.

Figure 5:
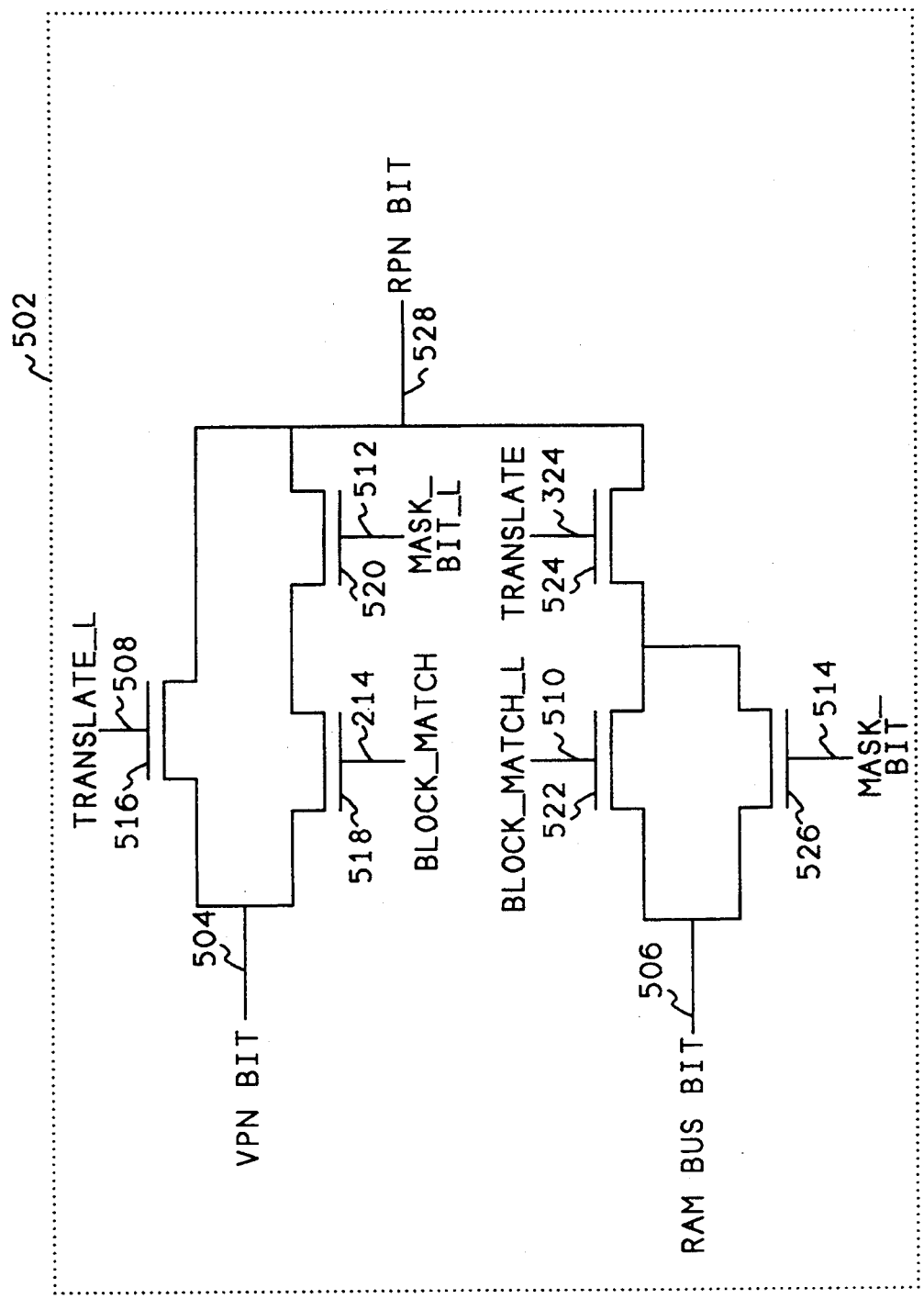
FIG. 5 shows the circuit for the maskable bits of the RPN bus driver of FIG. 2, implemented in CMOS logic.
Figure 6:
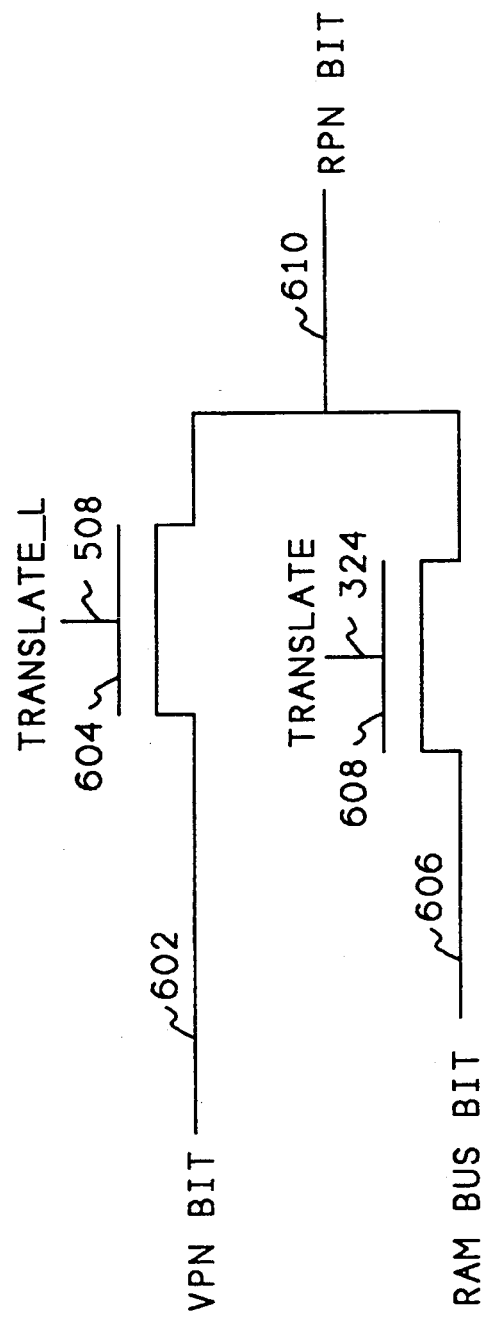
FIG. 6 shows a circuit for the non-maskable bits of the RPN bus driver of FIG. 2, implemented in CMOS logic.

FIG. 5 shows a CMOS circuit that is used for each of the maskable bits within the RPN BUS DRIVER 322. Referring now to FIG. 5, CMOS logic uses complementary signals, which are represented in FIGS. 5 and 6 (described below) by signals ending in _L. Thus, for example, TRANSLATE_L signal 508 is a complementary signal to TRANSLATE signal 324, formed by inverting the TRANSLATE signal 324. Other signals have complementary signals formed in the same way.

If translation is not being performed, the TRANSLATE_L signal 508, which will be high, causes transistor 516 to gate the VPN bit 504 to the RPN bit 528, while TRANSLATE signal 324, which will be low, prevents the RAM bus bit 506 from being gated to the RPN bit 528.

If translation is being performed, and a match occurs, and this maskable bit has its corresponding mask bit set to logical one, the MASK_BIT signal 514 and the TRANSLATE signal 324 will both be high causing transistors 526 and 524 to gate the RAM bus bit signal 506 to the RPN bus 528. At the same time, the TRANSLATE_L signal 508 and the MASK_BIT_L signal 512 will be low to block the VPN bit 504.

If translation is being performed, and a match occurs, and this maskable bit has its corresponding mask bit set to logical zero, the BLOCK_MATCH signal 214 and MASK_BIT_L signal will both be high causing transistors 518 and 520 gate the VPN bit to the RPN bus 528. At the same time, MASK_BIT signal 514 and BLOCK_MATCH_L signal 510 will be low, blocking the RAM bus bit 506.

If translation is not being performed, TRANSLATE_L signal 508 will be high, gating the VPN bits to the RPN bits.

FIG. 6 shows a CMOS circuit for the always used bits 314. Referring now to FIG. 6, if a translation is being performed, transistor 608 gates the RAM BUS bit 606 to the RPN bit 610. If translation is not being performed, transistor 604 gates the VPN bit 602 to the RPN bus 610.

Figure 7:
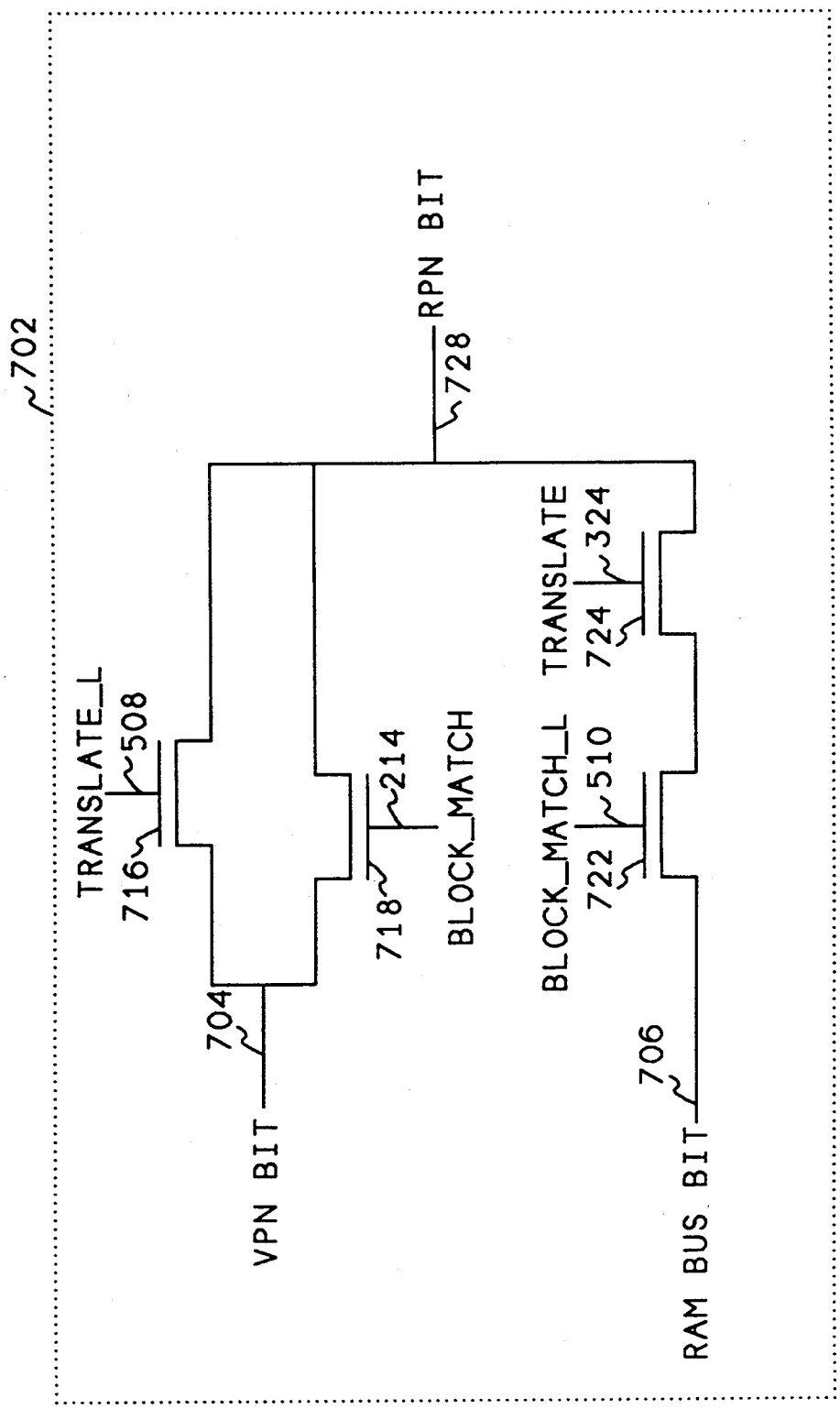
FIG. 7 shows a circuit for the mask bits of the RPN bus driver of FIG. 2, implemented in CMOS logic.

FIG. 7 shows a CMOS circuit that is used for each of the mask bits within the RPN BUS DRIVER 322. Referring now to FIG. 7, if translation is not being performed, the TRANSLATE_L signal 508, which will be high, causes transistor 716 to gate the VPN bit 704 to the RPN bit 728, while TRANSLATE signal 324, which will be low, prevents the RAM bus bit 706 from being gated to the RPN bit 728.

If translation is being performed, and a block match does not occur, the TRANSLATE signal 324 and the BLOCK_MATCH_L signal 510 will both be high causing transistors 722 and 724 to gate the RAM bus bit signal 706 to the RPN bus 728. At the same time, the BLOCK_MATCH signal 214 and the TRANSLATE_L signal will both be low to block the VPN bit 704.

If translation is not being performed, or a match occurs, the BLOCK_MATCH signal 214 or the TRANSLATE_L signal 508 will cause the VPN bit 704 to be gated to the RPN bus 728. At the same time, either transistor 722 or transistor 724 will block the RAM bus bit 706.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. In a translation lookaside buffer circuit of a virtual memory system, a block entry circuit for translating a virtual address to a real address, said block entry circuit comprising:
  virtual page number register means comprising
    an always care bits section,
    a maskable bits section, and
    a mask bits section, wherein bits within said mask bits section have a one-to-one correspondence with bits in said maskable bits section;
  compare means, connected to said virtual page number register and a virtual page number bus, for comparing a first virtual page number, contained in said always care bits section and said maskable bits section of said virtual page number register means, to a second virtual page number received from said virtual page number bus, and for signaling a match when said first and second virtual page numbers are equal, said compare means further comprising means for excluding zero or more of said maskable bits section bits from comparison when corresponding bits from said mask bits section have a value of binary zero and for including zero or more of said maskable bits section bits in said comparison when said corresponding bits have a value of binary one;
  real page number register means for storing a real page number comprising
    a mask bits section having contents identical to said mask bits section of said virtual page number register means, and
    a maskable bits section; and
  bus driver means for connecting said real page number register to a real page number output bus when said compare means signals said match comprising means for connecting zero or more of said maskable bits section bits of said real page number register to said real page number bus when corresponding bits from said mask bits section have a value of binary one and for connecting corresponding bits of said second virtual page number to said real page number bus when said mask bits section corresponding bits have a value of binary zero.

2. The block entry circuit of claim 1 wherein said corresponding bits comprise a succession of a lowest order bit to a highest order bit of each of said sections.

3. The block entry circuit of claim 1 wherein said corresponding bits comprise a succession of a lowest order bit to a highest order bit of said sections and said second virtual page number.

4. In a translation lookaside buffer circuit of a virtual memory system, a block entry circuit for translating a virtual address to a real address, said block entry circuit comprising: virtual page number register means comprising
    an always care bits section,
    a maskable bits section, and
    a mask bits section;
  compare means, connected to said virtual page number register and a virtual page number bus, for comparing a first virtual page number, contained in said always care bits section and said maskable bits section of said virtual page number register means, to a second virtual page number received from said virtual page number bus, and for signaling a match when said first and second virtual page numbers are equal, wherein said compare means further comprises means for excluding zero or more of said maskable bits section bits from comparison when corresponding bits from said mask bits section have a value of binary zero and for including said maskable bits section bits in said comparison when said corresponding bits have a value of binary one;
  real page number register means for storing a real page number comprising
    a mask bits section having contents identical to said mask bits section of said virtual page number register means, and
    a maskable bits section;

bus driver means for connecting said real page number register to a real page number bus when said compare means signals said match, said bus driver means further comprising means for connecting zero or more of said maskable bits section bits of said real page number register to said real page number bus when corresponding bits from said mask bits section have a value of binary one and for connecting corresponding bits of said second virtual page number to said real page number bus when said corresponding bits of said mask bits section of said real page number register have a value of binary zero.

5. In a translation lookaside buffer of a virtual memory system, a method for translating a virtual address to a real address, said method comprising the steps of:

(a) storing a first virtual page number in a virtual page number register means having an always care bits section and a maskable bits section for storing said virtual page number;

(b) storing a real page number in a real page number register;

(c) storing a plurality of mask bits in a mask bits section of said virtual page number register, wherein a one-to-one correspondence exists between said mask bits and said maskable bits in said virtual page number register;

(d) comparing said first virtual page number to a second virtual page number received from a virtual page number bus, wherein said comparing excludes zero or more of said virtual page number maskable bits from comparison when corresponding virtual page number mask bits have a value of binary zero and wherein said comparing includes zero or more of said virtual page number maskable bits in said comparison when said corresponding virtual page number mask bits have a value of binary one, and wherein said comparing signals a match when said first and second virtual page numbers are equal; and (e) connecting said real page number register to a real page number bus when said comparing signals said match;

wherein step (c) further comprises the following step (c1) and wherein step (e) further comprises the following step (e1) step:

(c1) storing said plurality of mask bits in a mask bits section of said real page number register, wherein a one-to-one correspondence exits between said mask bits and bits within a maskable bits section of said real page number register;

(e1) connecting zero or more bits of said maskable bits section in said real page number register to said real page number bus when corresponding bits from said mask bits section in said real page number register have a value of binary one and connecting corresponding bits of said second virtual page number to said real page number bus when said mask bits section of said real page number register corresponding bits have a value of binary zero.

6. In a translation lookaside buffer circuit of a virtual memory system, a block circuit for translating a virtual address to a real address, said block circuit comprising:

a plurality of block entry circuits, each comprising
  virtual page number register means comprising
    an always care bits section,
    a maskable bits section, and
    a mask bits section, wherein bits within said mask bits section have a one-to-one correspondence with bits in said maskable bits section,
  compare means, connected to said virtual page number register and a virtual page number bus, for comparing a first virtual page number, contained in said always care bits section and said maskable bits section of said virtual page number register means, to a second virtual page number received from said virtual page number bus, and for outputting a match signal when said first and second virtual page numbers are equal, said compare means further comprising means for excluding zero or more of said maskable bits section bits from comparison when corresponding bits from said mask bits section have a value of binary zero and for including zero or more of said maskable bits section bits in said comparison when said corresponding bits have a value of binary one, and
  real page number RAM means for storing a real page number and for connecting said real page number to a RAM output bus when said match signal is output comprising
    a mask bits section having contents identical to said mask bits section of said virtual page number register means, and
    a maskable bits section;
means for logically or-ing said match signal from each of said plurality of block entry circuits to form a block match signal; and
bus driver means for connecting said RAM output bus to a real page number output bus when said block match signal indicates a match occurred in one of said block entry circuits comprising
  means for connecting zero or more of said maskable bits section bits of said real page number RAM to said RAM output bus connected to said real page number output bus when corresponding bits from said mask bits section have a value of binary one and for connecting corresponding bits of said second virtual page number to said real page number output bus when said mask bits section corresponding bits have a value of binary zero.

7. The circuit of claim 6 wherein said corresponding bits comprise a succession of a lowest order bit to a highest order bit of each of said sections.

8. The circuit of claim 6 wherein said corresponding bits comprise a succession of a lowest order bit to a highest order bit of said sections and said second virtual page number.

* * * * *